United States Patent [19]

Witzko et al.

[11] Patent Number: 5,856,246
[45] Date of Patent: Jan. 5, 1999

[54] PERMANENT HYDROPHOBIC AND OLEOPHOTIC MODIFICATION FOR POLYMER SURFACES AND PROCESS OF MAKING SAME

[76] Inventors: Richard Witzko, Attlerau 6, 83512 Wasserburg; Wolfgang Bürger, Böcklerweg 30, 81825 München; Gudrun Petzold, Am Galgenberg 72, 01257 Dresden; Klaus Lunkwitz, Georg-Schumann-Str. 6, 01187 Dresden; Heide-Marie Buchhammer, Winterbergstr. 81, 01237 Dresden, all of Germany

[21] Appl. No.: 824,573

[22] Filed: Mar. 26, 1997

Related U.S. Application Data

[63] Continuation of Ser. No. 428,588, Apr. 25, 1995, abandoned, which is a continuation of Ser. No. 114,428, Aug. 30, 1993, abandoned.

[30] Foreign Application Priority Data

Aug. 31, 1992 [DE] Germany .......................... 42 28 975.0

[51] Int. Cl.$^6$ .............................. C08J 7/04; B01D 71/82; D06M 13/213
[52] U.S. Cl. .......................... 442/88; 8/115.56; 8/115.65; 8/115.66; 8/181; 8/196; 428/375; 428/378; 428/409; 428/420; 442/89; 442/92
[58] Field of Search .............................. 8/115.51, 115.56, 8/115.66, 115.65, 116.1, 181, 196; 442/88, 89, 92; 428/375, 378, 409, 420

[56] References Cited

U.S. PATENT DOCUMENTS

| | | | |
|---|---|---|---|
| 3,420,703 | 1/1969 | Kirkschnek et al. | 117/139.5 |
| 3,632,391 | 1/1972 | Whitfield et al. | 117/62.2 |
| 4,833,188 | 5/1989 | Kortmann et al. | 524/217 |
| 4,859,527 | 8/1989 | DiStefano | 428/288 |
| 4,988,572 | 1/1991 | Butters et al. | 428/413 |
| 5,091,269 | 2/1992 | Kondo et al. | 428/695 |

FOREIGN PATENT DOCUMENTS

| | | |
|---|---|---|
| 0124676 | 5/1983 | European Pat. Off. . |
| 102209 | 3/1984 | European Pat. Off. . |
| 458147 | 11/1991 | European Pat. Off. . |
| 505861 | 9/1992 | European Pat. Off. . |
| 3620033 | 6/1986 | Germany . |
| WO9105817 | 5/1991 | WIPO . |

OTHER PUBLICATIONS

Derwent Publications Ltd., London, GB; AN 87–089924 [13] JP–A–62 039 636 (Mitsubishi Rayon KK.) 20 Feb. 1987.
JP 1–174 539, Pat. Abstract Japan, C–643, 11 Oct. 1989, vol. 13/No. 451.
DE–Buch: Rompps Chemie–Lexikon, 7. Aufl., S. 2306/2307.
International Standard ISO 6330—Textiles—Domestic washing and drying procedures for textile testing, First edition—1984 Dec. 15.
International Standard CEI/IEC 456—Methods for measuring the performance of electric clothes washing machines for household use; 1974.
International Electrotechnical Commission Standard—Methods for measuring the performance of electric clothes washing machines for household use; Publication 456, 1974.
Dr. Th.Bohme Chemie & Service.

*Primary Examiner*—D. S. Nakarani
*Attorney, Agent, or Firm*—Gary A. Samuels

[57] ABSTRACT

The invention concerns a thin film of a permanent hydrophobic and optionally oleophobic finish for polymer surfaces. The film is formed from at least one layer of a water-soluble polycation and cationic synthetic resin. For further improvement of the oleophobic and permanent hydrophobic properties the film can additionally contain a long-chain surfactant or an alkyl-substituted polyanion.

3 Claims, No Drawings

PERMANENT HYDROPHOBIC AND OLEOPHOTIC MODIFICATION FOR POLYMER SURFACES AND PROCESS OF MAKING SAME

This application is a continuation of application Ser. No. 08/428,588 filed Apr. 25, 1995, now abandoned, which is a continuation of application Ser. No. 08/114,428 filed Aug. 30, 1993, now abandoned.

FIELD OF THE INVENTION

This invention relates to permanent hydrophobic and optionally oleophobic modification for polymer surfaces in a thin film. The invention also provides for the process to make such modification as well as its application of use.

BACKGROUND OF THE INVENTION

It is well known that hydrophobic finishes for fibers are based on aluminum and zirconium salts of long-chain carboxylic acids. Such hydrophobic finishes are described, for example, in E. B. Higgings, Waterproofing and Water Repellance, J. L. Moilliet, Editor, Elsevier Publishing Co., Amsterdam, p. 188, 1963. However, the finishes do not exhibit wash permanency due to the alkali solubility of the compounds (i.e. the ability of a finish to remain on the surface of a substrate after several wash cycles).

A paraffin-based finish described in DE 24 20 971 is currently preferred for use as an extender for polymer fluorocarbon finishes. This paraffin-based finish requires addition of salts or polymers in order to achieve adequate stability and wash resistance. A high application weight and the related changed hand and water vapor transport represent drawbacks of these finishes.

Metal compexes of chromium and pyridinium complexes of long-chain aliphatic compounds are regarded with increasing criticism with respect to toxicological problems. Similar concerns apply to formaldehyde resins, which impart good water repellency to the substrate, but tend to release formaldehyde.

Fluorinated copolymers based on polyacrylate (methacrylate) copolymers that are used as oleophobic and hydrophobic finishes such as in combination with cationically modified polyurethanes are described in DE 39 39 341. The specific application method of the finish depends on the fiber material. Also, organic solvents of the partially fluorinated copolymer must be used for application of these partially permanent finishes. In addition, the application of several fluorocarbon layers to the substrate is required, as well as the addition of various auxiliaries.

The combination of a perfluoroalkyl group-containing compound with quaternization products of basic fatty acid amides is described in DE 36 20 033. The use of fluoropolymers required for the finish is distinctly reduced by using this combination. However, for optimal hydrophobicity values during finishing of cotton/polyester at least 10 g/l are required. As a result significant amounts of additional products are also required including, for example, 60 g/l of synthetic resin, 4 g/l of catalyst or 20 g/l of fatty acid amide.

A modification of polyamide soft with 10 g/l acrylate copolymer and, for example, 10 g/l of a polycationic compound known as a paper glue component is proposed in EP 0 008 761. A good water repellant effect is achieved here, but water breakthrough is not satisfactory.

Oleophobic finishes for textiles cannot be obtained when an exclusively hydrophilic compound containing perfluoroalkyl groups is used. A hydrophobic and oleophobic effect can only be achieved in a combination of acrylate (co) polymer and fatty acid amide. An extender must be added in this case to improve permanence.

The use of low-molecular weight fluorocarbons (perfluoroalkanoic acids and their chromate complexes) fails due to insufficient wash resistance, especially hydrolysis under alkaline conditions. It should also be noted that waste disposal problems of fluorocarbon solutions must be viewed more critically in the future.

There is a need for an improved permanent hydrophobic finish that can be produced using limited amounts for coating forming monolayers or limited multilayers having good chemical and mechanical stability even in the presence of aqueous or aqueous-alcoholic solutions.

SUMMARY OF THE INVENTION

A permanent hydrophobic and optionally oleophobic thin film is provided for polymer surfaces comprising at least one layer of a water-soluble polycation and/or cationic synthetic resin and optionally a substance selected from the group consisting of long chain surfactants and alkyl-substituted polyanions. The film may be adsorbed onto a substrate surface and is bonded to the substance by forming a complex. A cationic synthetic resin may be used in addition to the cation and contains at least one polyfunctional compound in which at least one of the polyfunctional compounds contains ionic or dipole groups. The cationic synthetic resin may also contain two polyfunctional compounds. The long chain surfactants and alkyl-substituted polyanions are selected from the group consisting of wax or paraffin emulsions, wax dispersions with polyvinyl alcohol, acrylates, ethylene methacryic acid copolymers, ethylene methacrylic acid-vinyl acetate copolymers and fatty acid-modified resins. The alkyl group-containing polyanions are selected from the group consisting of partially esterified, amidated copolymers of maleic anhydride and partially esterified and amidated poly acryl (methacryl)ic acid derivatives. The surfactant may be an aliphatic-unbranched long-chain fluorinated surfactant or an anionic surfactant. The fluorinated surfactant may be selected from the group consisting of perfluoro carboxylic acid $(CF_3(CF_2)_n$—COOH with n>6 and perfluoroalkylsulfonic acids $CF_3(CF_2)_nSO_2OH$ with n>6.

A process to make the coating and application of the coating to a textile material or membrane are also provided for use in among other areas microfiltration and fabrics applications.

DETAILED DESCRIPTION OF THE INVENTION

A permanent hydrophobic and optionally oleophobic thin film for treating polymer surfaces is provided wherein the film is formed from at least one layer of a water-soluble polycation and/or a cationic synthetic resin as well as optionally a long chain surfactant or an alkyl-substituted polyanion.

As used herein, oleophobic means oil repellant and hydrophobic means water repellant.

A process for creating a permanent hydrophobic and optionally oleophobic modification on polymer surfaces is also provided in which the polymer surface is treated with a solution of a polycation and/or a cationic synthetic resin, as well as optionally with a solution of a long-chain surfactant or an alykl-substituted polyanion as a second component, wherein a complex is formed between the polycation and/or the cationic synthetic resin and the second component and this complex may be thermally fixed and reoriented.

Uses of the claimed modification to coat fibers or textile materials and to form membranes are also provided. These modified membranes and textiles may be used primarily in the microfiltration area (such as in the protection of electronic parts from penetration by oil and water) and in the fabrics area.

A porous membrane can be treated, especially on its entire surface, with a polycation and/or a cationically modified synthetic resin in order to create a positive excess charge, (i.e., a positive zeta-potential). Total surface is understood here to mean not only the outer surface, but also the interstitial areas (i.e., the pores of the membrane). Complex formation with long-chain ionic surfactants or alkyl-substituted polyanions is possible. The entire modified membrane, especially a microporous membrane, is then characterized by the fact that it is hydrophobic during charge equilibrium of the components and also oleophobic when perfluorinated ionic compounds are used.

The advantages of this treatment lie in the simplicity of its preparation, for example, only aqueous or aqueous-alcoholic starting solutions that are free of additional organic solvents are required, as well as the good washing permanence of the treated polymer surface, the limited amounts of treating chemicals employed and the application opportunities for many polymer substrates. Moreover, halogen-free permanent hydrophobic treatment may be obtained without addition of any toxic compounds.

The treatment according to the invention consists of a polycation and/or cationic synthetic resin that coats in limited concentration the polymer substrate surface, the surface of which for the most part exhibits a negative zeta potential, and imparts to the substrate surface a positive zeta potential. The second component of the treatment, which is essentially responsible for improvement of the hydrophobic and oleophobic properties, is a long-chain (anionic) surfactant, preferably a fluorinated surfactant or a polyanion with aliphatic or aliphatic/aromatic side chains.

The modification according to the invention is therefore designed so that a hydrophilic polycation and/or polycationic functionalized synthetic resin is situated on the polymer surface of the substrate and adsorptive forces (physical or electrostatic adsorption) create the bond between the substrate and the polycation. The polycation film has excess charge that imparts a positive zeta potential to the treated substrate and allows it to react with additional components. This reaction capability is utilized for complex formation with dissolved long-chain surfactants or polyanions in the subsequent step.

This modification of the polymer surface intentionally occurs with components that are characterized by a high degree of order on the surface and impart to the substrate water- and oil-repellant properties. The excess charge of the cationic film is utilized in an additional reaction possibility for crosslinking. A well directed complex formation may in combination with a thermal fixing process impart the desired permanence to the modification and serves for re- or new orientation of the outermost water- and oil-repellant components.

The modification according to the invention is due to an electrochemical interaction between the polymer surface and the polyelectrolyte. Permanent charge reversal of the polymer surface of the substrate occurs by selecting suitable and structured polycations and/or cationic synthetic resins and by reaction with branched, long-chain surfactants or alkyl-substituted polyanions and possible subseqent fixation. One obtains a stable state of order that has a permanent hydrophobic effect with the use of halogen-free compounds or an oleophobic effect with the use of fluorinated surfactants applied from solution.

The water-soluble polycation or cationic synthetic resin is chosen so that it coats all of the outer surfaces of the substrate in the shortest possible time, causes charge reversal of the substrate (to a positive zeta potential) and, as a result, intitiates positive excess charge of the substrate. This charged substrate must exhibit sufficiently free and readily accessible reactive groups that are in a position to form a stable complex with anionic, long-chain surfactants or alkyl-substituted polyanions. These functional compounds must be in a position to create a high degree of order on the surface during the complex formation and the subsequent fixing process by a pre-orientation in the molecule.

Fluorine-free, as well as fluorine-containing variants, are possible for the process in a single-bath or two-bath process. Depending on the selected variant of modification, permanent hydrophobic and/or especially oleophobic effects can be achieved.

The modification according to the invention can be used for a number of polymer substrates with negative zeta potential. These include fibers, flat textile articles and also membrane materials. These fibers or textile flat products include both synthetic and natural polymer starting materials. The natural starting materials include, in particular, cellulose, cotton, wool or silk. Mixtures of synthetic and natural polymer starting materials can also be used. Detachment of layers is reduced to a minimum as a result of the complex stability.

Optimal modification can optionally be achieved with a monolayer of the complex, since the coating of the polycation or cationic synthetic resin on the substrate is insensitive to concentration.

Preferred modifications with at least one monolayer of the complex can be obtained:

(a) by adsorbing a polycation and/or a cationic synthetic resin onto the substrate surface and complexing the layer with at least one alkyl group-containing polyanion or (b) adsorbing a polycation and/or a cationic synthetic resin onto the substrate surface and complexing the layer with aliphatic, unbranched, long-chain fluorinated surfactants.

An additional variant that lies within the scope of the invention consists of:

(c) adsorbing a polycation on the substrate surface and complexing the layer with at least one, preferably two synthetic resins that contain polyfunctional compounds, in which at least one polyfunctional compound contains ionic or dipole groups.

In this case the synthetic resin serves as the second component and produces the sought charge equalization by its anionic constituents.

The following components can preferably be used for modification (a) (identified above) include:
partially esterified or amidated copolymers of maleic anhydride; and
partially esterified or amidated polyacryl (methacryl)ic acid derivatives.

Compounds preferred for use in modification (b) (identified above) include:
perfluorocarboxylic acids $CF_3-(CF_2)_n-COOH$, $n>6$; and
perfluoroalkylsulfonic acids $CF_3-(CF_2)_n-SO_2OH$, $n>6$.

Compounds preferred for use in modification (c) (identified above) include:

wax and paraffin emulsions; and wax dispersions with polyvinyl alcohol, acrylates, ethylene-methacrylic acid copolymers, ethylene-methacrylic acid-vinyl acetate copolymers; and resins modified with fatty acids.

Polyfunctional compounds that can enter into chemical bonds with the polycations also include compounds that exhibit multiple bonds capable of addition, epoxide groups, aldehyde groups, isocyanate groups, as well as acid anhydride groups and acyl halide groups.

Water is the preferred solvent for the polycations or cationic synthetic resins, although other solvents, such as lower alcohols alone or combined with water, can be used. Depending on the type of polycations employed (molecular weight, charge density, type of functional groups) and the reaction conditions (temperature, pH, reaction time), an optimal terminal group activity and surface covering can be achieved.

Reaction time varies from 1 (one) second to 1 (one) hour. The reactivity of the functional groups can be influenced by the pH value; optimal values for complex formation lie between pH 4 and pH 8. After adsorption of the polycation or cationic synthetic resin to the substrate, the excess cationic fracton is eliminated by squeezing or by water treatment. Complex formation again occurs from an aqueous solution, in which:

A) modified synthetic resins are used, for example, from 0.1 to 50% aqueous solutions/dispersions. These solutions preferably contain 5 to 60 g of synthetic resin per 1000 ml of water;

B) alkyl group-containing or other polyanions, which are applied, for example, from 0.01 to 30% aqueous solutions. These solutions preferably contain 1 to 20% polyanion;

C) aliphatic, long-chain, anionic fluorinated surfactants, which are used, for example, in 0.01 to 20% aqueous-alcoholic solutions. These solutions preferably contain 0.1 to 10% of the surfactant.

Expression of the active hydrophobic or hydrophobic-oleophobic complex can optionally be carried out at elevated temperatures, for example, in the range from 10° to 80° C.

Conversion can occur in one or two stages. One stage means that the polycation or cationic synthetic resin and one of the so-called second components (surfactant, polyanion) are applied in one bath. This occurs, in particular, in case A (above), i.e., a variant in which a cationically modified synthetic resin is used in addition to the polycation. A two-stage process is preferred when a polyanion or a fluorinated surfactant is used as a second component in addition to the polycation and/or polycationic synthetic resin. Uncontrolled complex formation in the solution is ruled out by stagewise treatment of the substrate in separate reaction solutions and optimal hydrophobic and/or oleophobic modification is thus achieved at a limited initial concentration of the reaction solutions.

Membranes that can be modified according to the described conversion consist of polyolefins, polyesters, cellulose, polyamides and polyurethanes. Polytetrafluoroethylene and polyvinylidene fluoride or perfluorinated copolymers with sulfonic and carboxylic acid groups in the side chain, as well as polyethylene and polypropylene as polyolefin are particularly preferred. Preferred polyester membranes consist of aromatic polyesters.

After modification of the polymer surfaces, especially fibers or textile fabrics, a fixation process ensues at temperatures between 100° and 180° C. The fixation time is dependent on the substrate and must be adjusted to each polymer. One preferably operates between 5 seconds and 5 minutes.

The invention is further understood by the following examples. For this purpose the oil repellance and water repellance were tested as follows on test compounds.

Oil Repellancy

Oil repellancy tests were carried out on textile fabrics according to AATCC 118-1989 T. In this test, a test specimen approximately 20×20cm that was conditioned for at least four hours at 21°±1° C. and 65±2% RH was used. Standard test liquids of selected hydrocarbons having various surface tensions rated from 1–8 by AATCC oil repellancy including (from lowest rating to highest) a mineral oil identified as Nujol®, a trademark of Plough, Inc.; a mixture of Nujol: n-hexadecane (65:35); n-hexadecane; n-tetradecane; n-dodecane; n-decane; n-octane; and n-heptane were prepared. The test specimen was placed flat on a smooth, horizontal surface. Beginning with the AATCC lowest-numbered test liquid, a small drop (about 0.05 ml) was carefully placed on the test specimen in several locations. The drop was observed for about 30 seconds from approximately a 45° angle. Any penetration or wetting of the fabric at the liquid-fabric interface and any wicking of the liquid through the fabric was observed. This procedure was repeated for the remaining seven solutions in increasing AATCC order.

Water Repellancy

Water repellancy was tested as follows:

The samples tested (each about 20×30 cm) were stretched crease-free on a tension ring. Each tightened sample was then placed on a slanted ring holder (in striped fabric the direction of the stripes was always positioned vertically). Approximately 250 ml of water having a temperature of approximately 18°–20° C. was used for this test.

The water was filled into an aligned plastic funnel. After the water was run through, the tension ring was removed and struck twice against a hard object. The procedure was repeated on the opposite side of the ring.

The sample was rated by comparision with a visual standard, as well as their description:

Grade 50: complete wetting of the entire fabric surface

Grade 70: partial wetting of larger areas

Grade 80: distinct wetting on the surface at the points exposed to water.

Grade 90: light, more random adhesion of drops

Grade 100: no adhesion of drops, the water is completely repelled.

The washing method used corresponded to German Standard DIN 53920 ("Easy to manage" program, 60° C. and prewashing no. 3, loading of the washing machine with 1.5 kg of standard fabric). The detergent used was an IEC test detergemt (a washing detergent specified in DIN 53920) type 1; since the water hardness was average, the dosage of the IEC detergent was for the pre- and main washing. For each test the sample material was ironed and laid out at room temperature.

EXAMPLE 1

A one-stage process for fluorine-free hydrophobic finishing of a textile fabric (polyester) with the following treatment steps was conducted:

a) The fabric was immersed in an isopropanol/water solution (1:1) at 50° C. for 2 minutes.

b) The pretreated sample was treated in a solution of polycation and synthetic resin (Table 1) at 60° C. vigorously for 5 minutes.

c) The sample was wrung, dried, and finally fixed (5 minutes at 160° C.).

The results are shown in Table 1.

TABLE 1

| Material | Cationic Polycation | Cationic Synthetic Resin | Water Repellancy Hydrophobic effect, Spray test after normal washing | | | |
|---|---|---|---|---|---|---|
| | | | 0 | 5 | 10 | 15 |
| Polyester | PAA[1] (0.05 N) | Tehabol[3] (30 g/L) | 80 | 80 | 70 | 70 |
| | PAA (0.10N) | Tehabol (30 g/L) | 80 | 80 | 70 | 70–80 |
| | PAA (0.05 N) | Baygard[4] EP (10 g/L) | 70 | 70 | 50 | |
| | PEI[2] (0.10 N) | Tehabol (30 g/L) | 80 | 80 | 70 | 70–50 |

[1] Polyallylamine hydrochloride
[2] Polyethyleneimine
[3] A fatty acid condensate having a cationic charge used as an extender for stain protection finish, commercially available from Dr. Th Bohme KG of Geretsried, Germany. Tehabol is a trademark of Dr. Th. Bohme KG
[4] An aqueous preparation of a fatty acid polyalkylamide having a cationic charge used as an extender for the finish of synthetic fibers, commercially available from Bayer AG of Germany. Baygard is a registered trademark of Bayer AG.

EXAMPLE 2

A textile fabric (polyamide) was modified as described under Example 1.

The results are shown in Table 2.

TABLE 2

| Material | Cationic Polycation | Cationic Synthetic Resin | Water Repellancy Hydrophobic effect, Spray test after normal washing | | | |
|---|---|---|---|---|---|---|
| | | | 0 | 5 | 10 | 15 |
| Polyamide | PAA[1] (0.05 N) | Tehabol[3] (30 g/L) | 80 | 80 | 70 | 70–50 |
| | PAA (0.10 N) | Tehabol (30 g/L) | 80 | 80 | 70 | 70–50 |
| | PAA (0.05 N) | Baygard[4] EP (10 g/L) | 50 | 50 | | |
| | PET (0.10 N) | Tehabol (30 g/L) | 80 | 80 | 70 | 50 |

As is apparent from Examples 1 and 2, fluorine-free hydrophobic finishing of PES and PA with very good wash permanence become possible by combining limited amounts of a hydrophilic, polycationic component with a fluorine-free synthetic resin based on a fatty acid polycondensation product that was used in place of the extender for finishing with fluroocarbon resins. Use of the polycationic component significantly increased the permanence of the finish relative to the pure resin.

EXAMPLE 3

(Comparative Example)

Polyamide fabric and polyester fabric were finished according to Example 1, during which only Tehabol or only a polycation solution was used. The results are shown in Table 3.

TABLE 3

| Material | Polycation | Cationic Synthetic Resin | Water Repellancy Hydrophobic effect, Spray test after normal washing | | | |
|---|---|---|---|---|---|---|
| | | | 0 | 5 | 10 | 15 |
| Polyester | — | Tehabal[3] (30 g/L) | 80 | 70 | 50 | 0 |
| | PAA (0.10 N) | — | 0 | | | |
| Polyamide | — | Tehabol (30 g/L) | 80 | 70 | 50 | 0 |
| | PAA (0.10 N) | — | 0 | | | |

EXAMPLE 4

Two-stage process for fluorine-free hydrophobic finishing of a textile fabric: The first step of the method occurred in a similar fashion to treatment steps a and b of Example 1. The wrung fabric was then treated intensively with a polyanion solution in a second process step. Reprocessing of the sample so finished occurred according to c) in Example 1. The results are shown in Table 4.

EXAMPLE 5

A textile fabric (polyamide) was finished as described under Example 4. The results are shown in Table 4.

EXAMPLE 6

A textile fabric (polyester/cotton) was treated according to Example 4. The results are shown in Table 4.

The results shown in Table 4 indicate that by the additional use of a polyanion, the hydrophobic effect was maintained or was substantially improved in the case of polyamide finishing (as can be seen by comparing with Examples 1 and 2). The method according to the invention is suitable for fluorine-free hydrophobic finishing of cotton/polyester blends.

TABLE 4

| Material | First Step | Second Step | Water Repellancy Hydrophobic effect, Spray test after normal washing | | | |
|---|---|---|---|---|---|---|
| | | | 0 | 5 | 10 | 15 |
| PES | PAA (0.1 N) Tehabol (30 g/L) | PAS(1) (0.01 N) | 80 | 70 | 70 | 50 |
| PES | PAA (0.1 N) | PAS (0.01 N) | 0 | | | |
| PES | PEI (0.1 N) | Poly-MSA(2) | 70 | 70 | 70 | 70–50 |
| PES | Tehabol (30 g/L) | Poly-MSA (0.01 N) | 80 | 80 | 80 | 70 |
| PA | PAA (0.1 N) Tehabol (30 g/L) | PAS (0.01 N) | 80 | 70 | 70 | 50 |
| PA | PAA (0.1 N) | PAS (0.01 N) | 0 | | | |
| PA | PEI (0.01 N) Tehabol (30 g/L) | Poly-MSA (0.01 N) | 90 | 90 | 80 | 80–70 |
| PA | Tehabol (30 g/L) | Poly-MSA (0.01 N) | 90 | 90 | 80 | 80–70 |
| Cotton/ PES | PAA (0.1 N) Tehabol (30 g/L) | / | 90 | 70 | 50 | |

TABLE 4-continued

| Material | First Step | Second Step | Water Repellancy Hydrophobic effect, Spray test after normal washing | | | |
|---|---|---|---|---|---|---|
| | | | 0 | 5 | 10 | 15 |
| Cotton/ PES | PAA (0.1 N) Tehabol (30 g/L) | PAS (0.05 N) | 80 | 50 | | |

(1) PAS - polyacrylic acid
(2) Poly-MSA - maleic anhydride copolymer.

EXAMPLE 7

A two-stage process for a fluorine-containing hydrophobic and oleophobic finish of a textile fabric (polyester): modification of the fabric occurred in two separate treatment stages in similar fashion to Example 4, during which an aqueous-alcoholic fluorinated surfactant solution was used in the second treatment step instead of the polyanion solution. The results are summarized in Table 5.

EXAMPLE 8

A textile fabric (polyamide) was modified as described in Example 7. The results are shown in Table 5.

The attainable oleophobic (oil repellant) values, especially in the resin-free variants, were very good for PA and PES.

TABLE 5

| Material | First Step | Second Step | Oil Repellancy Oleophobic Value | Water Repellancy Hydrophobic Effect |
|---|---|---|---|---|
| PES | PM (0.05 N) Baygard EP (10 g/L) | C8F$_{17}$SO$_2$OH (0.01 N) | 5 | 70 |
| PES | PAA (0.1 N) | C8F$_{17}$SO$_2$OH (0.01 N) | 8 | 70 |
| PES | PAA (0.1 N) | C$_7$F$_{15}$COOH (0.01 N) | 6 | 50 |
| PES | PEI (0.1 N) | C8F$_{17}$SO$_2$OH (0.01 N) | 6 | 70–50 |
| PA | PAA (0.05 N) Baygard EP | C8F$_{17}$SO$_2$OH (0.01 N) | 5 | 70 |
| PA | PAA (0.1 N) | C8F$_{17}$SO$_2$OH (0.01 N) | 8 | 70 |
| PA | PAA (0.1 N) | C$_7$F$_{15}$COOH (0.01 N) | 5 | 70 |
| PA | PEI (0.1 N) | C8F$_{17}$SO$_2$OH (0.01 N) | 6 | 70–50 |

EXAMPLE 9

The textile materials were modified with a 0.05N polycation solution (PAA).

The following zeta potentials were determined:

TABLE 6

| Material | Zeta Potential Before Modification in mV | Zeta Potential After Modificatian in mV | Weight Increase in % |
|---|---|---|---|
| PES | −6.6 | +20.5 | 0.3 |
| PA | −21.7 | +35.8 | 0.3 |

The results show charge reversal of the materials.

We claim:

1. A treated material selected from fiber, textile, polymer or membrane consisting essentially of said material and a layer on said material of a complex of a water-soluble-polycation selected from the group consisting of polyallylamine hydrochloride and polyethyleneimine, and a surfactant that is an aliphatic-unbranched fluorinated surfactant that has a carbon chain greater than 6 carbons, said complex forming an olephobic coating on said material.

2. The treated material of claim 1 wherein the surfactant is a perfluorinated carboxylic acid or a perfluorinated sulfonic acid.

3. The treated material of claim 2 wherein the perfluorinated carboxylic acid has the formula

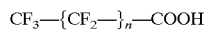

and wherein the perfluorinated sulfonic acid has the formula

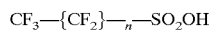

wherein n is an integer of 7 or more.

* * * * *